US008076942B2

(12) United States Patent
Tulupov et al.

(10) Patent No.: US 8,076,942 B2
(45) Date of Patent: Dec. 13, 2011

(54) METHOD FOR MARINE ELECTRICAL SURVEY OF OIL-AND-GAS DEPOSITS

(75) Inventors: Andrej Vladimirovich Tulupov, Moscow (RU); Evgeny Dmitrievich Lisitsyn, Saint Petersburg (RU); Vladimir Eduardovich Kyasper, Saint Petersburg (RU); Alexander Arkad'evich Petrov, Saint Petersburg (RU); Mikhail Sergeevich Malovichko, Saint Petersburg (RU)

(73) Assignee: "Emmet" JSC, Moscow (RU)

( * ) Notice: Subject to any disclaimer, the term of this patent is extended or adjusted under 35 U.S.C. 154(b) by 361 days.

(21) Appl. No.: 12/459,626

(22) Filed: Jul. 6, 2009

(65) Prior Publication Data

US 2010/0226205 A1     Sep. 9, 2010

(30) Foreign Application Priority Data

Mar. 4, 2009   (RU) ................................ 2009107622

(51) Int. Cl.
*G01V 3/02* (2006.01)
(52) U.S. Cl. .................... 324/365; 324/357; 324/362
(58) Field of Classification Search ............. 324/365, 324/345, 357, 362
See application file for complete search history.

(56) References Cited

FOREIGN PATENT DOCUMENTS

| RU | 2324956 | 5/2008 |
| WO | WO2007/068259 | 6/2007 |
| WO | WO2007/136276 | 11/2007 |

*Primary Examiner* — Reena Aurora
(74) *Attorney, Agent, or Firm* — Aleksandr Smushkovich (57) ABSTRACT

A method for survey of hydrocarbon deposits in a researched profile of sea-bottom comprises providing a generator generating pulse electric current with a generator frequency in a towable generator line exciting electric field signals measured by sea-bottom stations synchronized with the generator, forming space-domain data arrays for the generator frequency and for higher odd harmonics frequencies nearest thereto, forming time-domain data arrays for selected offsets, inversion of the time-domain and space-domain data, and determining a bottom strata resistivity and polarization characteristics for the researched profile, based the inversion's results. The inversion preferably encompasses synchronizing and adjusting the generator line and electric field signals, dividing them into a frequency branch, including a fast Fourier transform and a robust summation producing the space-domain arrays, and a time-domain branch, including a robust summation producing the time-domain arrays. Embodiments include transient field analysis with spatial derivatives, special towing configurations, generator line types choices, etc.

12 Claims, 7 Drawing Sheets

Fig. 7

METHOD FOR MARINE ELECTRICAL SURVEY OF OIL-AND-GAS DEPOSITS

CROSS-REFERENCE TO RELATED APPLICATION

This U.S. patent application claims priority under 35 U.S.C. 119(a) through (d) from a Russian Federation patent application No. 2009107622 filed on Mar. 4, 2009.

BACKGROUND OF THE INVENTION

The invention relates to the field of marine geo-electrical survey, in particular, to surveys utilizing methods of induced polarization, and is intended for providing prognosis on hydrocarbon deposits in sea-bottom strata.

Nowadays there are known numerous widely used methods for marine survey of hydrocarbon deposits, typically including: a probing (sounding) of the sea-bottom by pulses of electromagnetic field, registration of changes of electromagnetic parameters of the sea near-bottom strata, preliminary processing and analysis of the obtained data for detection of existing anomalies of the strata, and determination of the nature of such anomalies (e.g., RU 2236028, 2004; SU 1122998, 1984; SU 1798666, 1996; SU 1434385, 1988; U.S. Pat. No. 4,298,840, 1981; U.S. Pat. No. 4,617,518, 1986, etc.), whereat employing different research complexes of equipment (herein further called 'RC').

Exemplarily, a method for marine electric survey and a research complex used therefor are known, having a conventional name CSEM (L. MacGregor, M. Sinha /Geophysical Prospecting, 2000, 48, 1091-1106; UK. Pat. No. 2402745, issued 2003), allowing to execute the survey at sea depths up to 3 km. The essence of this method is that electromagnetic pulses are transmitted from a horizontal dipole with a momentum of about $10^4$ Am; the dipole is towed by a vessel in a region, wherein sea-bottom stations are installed at a distance about 50 m from the sea-bottom, and the sea-bottom stations radiate a continuous pulse signal of electromagnetic field with a frequency in the range of 0.25-4 Hz. The signal is affected by the environment, and is further received by the sea-bottom stations. Since the resistivity of the sea water is lower than one of the sea-bottom, the signal quickly damps in the water, and, as a result, in case of measuring at the distance more than 500 m from the radiation source, the sea-bottom station receives only the signals related to the sea-bottom strata resistivity. Thusly, the receivers of the sea-bottom stations register two orthogonal components of the horizontal electric field at the distance up to 15 km from the source. Studies of the changes in amplitude and phase of the obtained signal allows receiving information on the electric resistivity of the strata up to depths of 5-7 km. The obtained data are compared with analogous data obtained from a similar region, where the hydrocarbons deposits are absent, and on the base of comparison, a conclusion is drawn on the region perspectives concerning the hydrocarbons deposits.

However, the CSEM technology doesn't allow obtaining data on the strata chargeability that significantly decreases the accuracy of prognosis. Another disadvantage of this method is a relatively low spatial resolution and technological difficulties in the case of using this method at shallow water.

There is known a technology of marine electric survey for oil-and-gas deposits in shelf zones, earlier developed by the instant authors (International Patent Application PCT/EA/2006/000009 hereby entirely incorporated by reference). The essence of the technology is that before the submersion, one synchronizes the clocks mounted on an excitation field formation block in the dipole and on the sea-bottom stations; the dipole is towed by a vessel on the sea surface along an observation profile; the field excitation is carried out by periodical electromagnetic pulses of different polarity with pauses between them; the electrical field registration is carried out by multi-channel sea-bottom stations furnished with braided receiving lines, having at least three electrodes, located at a distance 50-500 meters from one another and allowing to measure both the field potentials and its spatial derivatives along the observation profile; one registers time series of received signals, recording the potentials differences and the spatial derivatives of the electric field, both at on-time and at off-time of current; analyzing the signals, one takes into consideration the change of primary and secondary fields in a time domain and in a space domain simultaneously; and one determines both the strata resistivity and its polarization characteristics. However this technology is not usable for large depths.

There is another technology of sea-bottom research, earlier developed by the instant authors (RU0048645, issued in 2005, hereby entirely incorporated by reference), considered close to the claimed method. According to it, the electric field excitation is carried out by a vertical or horizontal dipole, in which bipolar pulses are formed with pauses therebetween, and the measuring of orthogonal components of the field are executed by the sea-bottom stations. Thus, the basic data are obtained in the time domain, and their inversion allows not only to obtain data on the bottom strata resistivity, but also to mark out chargeability anomalies, related to hydrocarbon deposits.

The most similar related art method to the claimed method is a technology of sea-bottom research, earlier developed by the instant authors (Patent of Russian Federation RU2324956, U.S. Pat. No. 7,529,627, hereby entirely incorporated by reference), according to which: one compares the clocks mounted on a dipole and on sea-bottom stations before the submersion of the sea-bottom stations in a research zone; a vessel tows the vertical dipole placed in the zone of the stations location, so that its upper end would be at a distance not exceeding 200 meters from the sea surface, and its lower end would be at a distance not exceeding 100 meters from the sea-bottom; the electric field excitation is executed by periodical pulses of opposite polarity with pauses between them fixed in time; the obtained information on electric resistivity of the sea-bottom strata from the sea-bottom stations is presented in the form of time series of horizontal and vertical field components, both at on-time and at off-time of current; and in the signals analysis one takes into consideration the change of both the primary and secondary fields in time. Besides the data characterizing the strata resistivity, one determines its polarization characteristics. Based on the resistivity and polarization characteristics, a modeling of the profile of sea-bottom strata is carried out, and a prognosis on hydrocarbon deposits presence is made based on the modeling. This technology has a high geological efficiency; however the available depth of research sharply decreases in the case of presence of polarizing strata within the sea-bottom strata.

BRIEF DESCRIPTION OF THE INVENTION

Therefore, the engineering problem to be solved by the instant invention was the creation of a more universal technological method, i.e. suitable both for the great depths and for the shallow water conditions, which would allow increasing the prognosis accuracy for the presence of hydrocarbons in researched strata.

The solution of the engineering problem is achieved by providing an inventive method for marine electrical survey of hydrocarbon deposits in a researched profile of sea-bottom, comprising the steps of: providing a generator of electric current, the generator is associated with a generator clock; providing a generator line, being an electric load of the generator, wherein the generator is capable of generating a predetermined electric current in the form of alternative-sign (bipolar) pulses, preferably of the rectangular shape, in the generator line, with a generator signal frequency associated with a duration and an on-off time ratio of the pulses, specified by a predeterminedly programmed computer, the generator line is capable of exciting an electric field; providing a tow means capable of towing the generator line, preferably a suitable vessel; providing a plurality of multi-channel sea-bottom stations capable of measuring signals of the electric field, wherein each station has electrodes, and is associated with a station clock; synchronizing the generator clock and the station clock for each of the sea-bottom stations; mounting the sea-bottom stations at predetermined points, including a first point and a last point, along a predetermined profile line extending through and beyond the researched profile; positioning the tow means at a predetermined distance in the range preferably of 5-15 km from the first point beyond the researched profile; towing the generator line by the tow means along the predetermined profile line to a point located at the predetermined distance from the last point beyond the profile; switching the generator on and causing the generator line of exciting the electric field; measuring time series of the electric current signals of the generator line by means of an onboard recorder (not illustrated) mounted on the tow means, and measuring time series of the signals of electric field by the sea-bottom stations during both the on and off periods of the electric current pulses; recording signal values of the measured signal time series; for each sea-bottom station forming a plurality of space-domain data arrays for dependencies of the signal values upon a distance from the center of generator line to each of the sea-bottom stations (herein called an 'offset') during the movement of the vessel, wherein the dependencies are formed for the generator signal frequency and for a predetermined number of higher odd harmonics frequencies nearest to the generator signal frequency, and forming a plurality of time-domain data arrays for selected offsets based on the recorded signal values, the time domain data arrays are formed for dependencies of the signal values upon time, wherein the dependencies are formed for time intervals of signal growing or decay after switching on or off the current in the generator line, and these signal growings or decays are herein called 'transient fields'; providing predetermined steps for data inversion, i.e. a joint data inversion for each of the sea-bottom station for the time-domain data arrays and for the space-domain data arrays; determining both a bottom strata resistivity for a predetermined depth of the researched profile and polarization characteristics of the researched profile based on the results of the joint data inversion; determining anomalies of the bottom strata resistivity and the polarization characteristics; and evaluating the presence of the hydrocarbons deposits according to the anomalies.

The predetermined steps for data inversion are preferably represented by the following acts: synchronizing the generator signal time series and the sea-bottom station signal time series thereby obtaining synchronized signals; adjusting the synchronized signals by removing drift of the electrodes of the sea-bottom stations; dividing the adjusted signals into a frequency processing branch and a time-domain processing branch; wherein the frequency processing branch includes a fast Fourier transform and a robust summation producing the plurality of space-domain data arrays, and the time-domain processing branch includes a robust summation producing the plurality of time-domain data arrays. The space-domain data arrays, the time-domain data arrays, and predetermined programmed information are further processed by a joint inversion program unit executing known data inversion operations.

Depending on the survey conditions, the generator line can be employed in the form of a horizontal dipole line and used in conjunction with sea-bottom stations furnished with receiving lines (Russian Federation Patent Application RU2007106562 hereby entirely incorporated by reference), or in the form of a vertical dipole line and used in conjunction with separately located sea-bottom stations (U.S. Pat. No. 7,529,627 hereby entirely incorporated by reference).

Final differences, herein, also called 'spatial derivatives' can be calculated based on values of signals, measured at different offsets, obtained either from the space-domain data arrays, or from the time-domain data arrays. For analyzing the transient fields of the electric field signals in preferred embodiments of the present invention, both decays of the transient fields and the spatial derivatives should be used.

For increasing the signal-to-noise ratio during the measuring of the transient fields, it is preferable to provide the integration of measured signal decays in a predetermined range of offsets, for example, 1000-2000 m. This integration also can preferably be applied to the differences between the decays of sequential pulses, divided by the difference between the corresponding offsets.

Preferably, the sea-bottom stations are placed along the researched profile with a predetermined step therebetween in a predetermined central region, and with another step, equal to the foregoing predetermined step multiplied by a predetermined integer coefficient, in predetermined peripheral regions of the profile.

In preferred embodiments, the inventive method operates as follows. After the synchronization of the clocks of the generator and the sea-bottom stations, the stations are mounted at the predetermined points of the sea bottom along the observation profile and the locations of the stations are mapped, for example, using a known underwater navigation system.

The sea-bottom stations are placed along the researched profile as described above, and thereafter the vessel moves to a point located at a distance 5-15 km (depending on the target research depth) from the first point station, and begins probing the researched profile, whereat the aforementioned alternative-sign current pulses with pauses therebetween are formed in the generator line. The beginning and the end of the current pulses are measured with a predeterminedly high accuracy, for example, according to the PPS signal of the GPS. The immediate positions of the beginning and the end of the generator line (the generator line's electrodes) are controlled with the help of the GPS (for the generator line towed on the surface), or controlled with a known acoustic station for underwater navigation.

After completion of the probing of the researched profile, the sea-bottom stations are recovered (lifted on the vessel), the correction of the sea-bottom station clocks and the generator clock is executed, and the time-domain and the space-domain arrays are formed based on the measured data for each station; the joint data inversion is provided, which allows determining the parameters of resistivity and chargeability (polarization) of the sea-bottom sediments and according to their anomalies, in comparison with data obtained in the other regions, to make a prognosis on the presence of hydrocarbon deposits.

The proposed method may be significantly enhanced, if a predetermined sea-bottom station is established as a reference station, and the time-domain and the space-domain data arrays are formed symmetrically in relation to the reference station, wherein the arrays are subjected to the joint data inversion. Such enhancement allows essentially expanding the range of application of one-dimensional models utilized in the hydrocarbon deposits prognosis.

EXEMPLARY PREFERRED EMBODIMENTS OF THE INVENTION

While the invention may be susceptible to embodiment in different forms, there are shown in the drawing, and will be described in detail herein, specific embodiments of the present invention, with the understanding that the present disclosure is to be considered as exemplification of the principles of the invention, and is not intended to limit the invention to that as illustrated and described herein.

Figure 1:
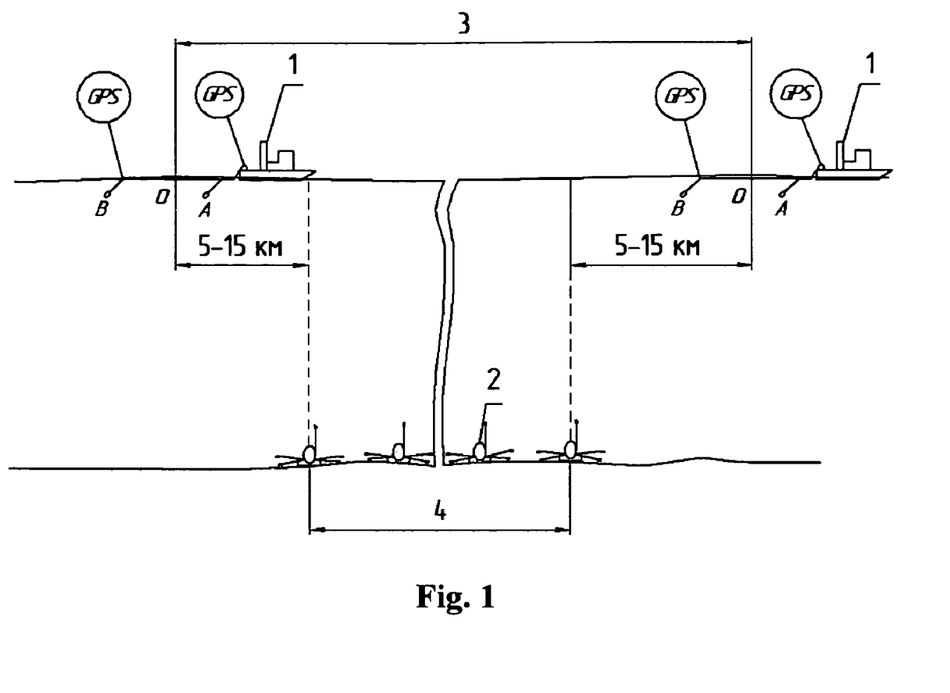
FIG. 1 schematically illustrates dispositions of the vessel and the sea-bottom stations, according to an embodiment of the present invention.

The general scheme of positional relationship of the vessel and the sea-bottom stations is shown at the FIG. 1, wherein (1) denotes a vessel with a towed generator line, (2) denotes a plurality of sea-bottom stations, (3) denotes a researched profile, (4) denotes a line of disposition of the sea-bottom stations, (A) denotes a first end (electrode) of the generator line, and (B) denotes a second end (electrode) of the generator line.

Figure 2:
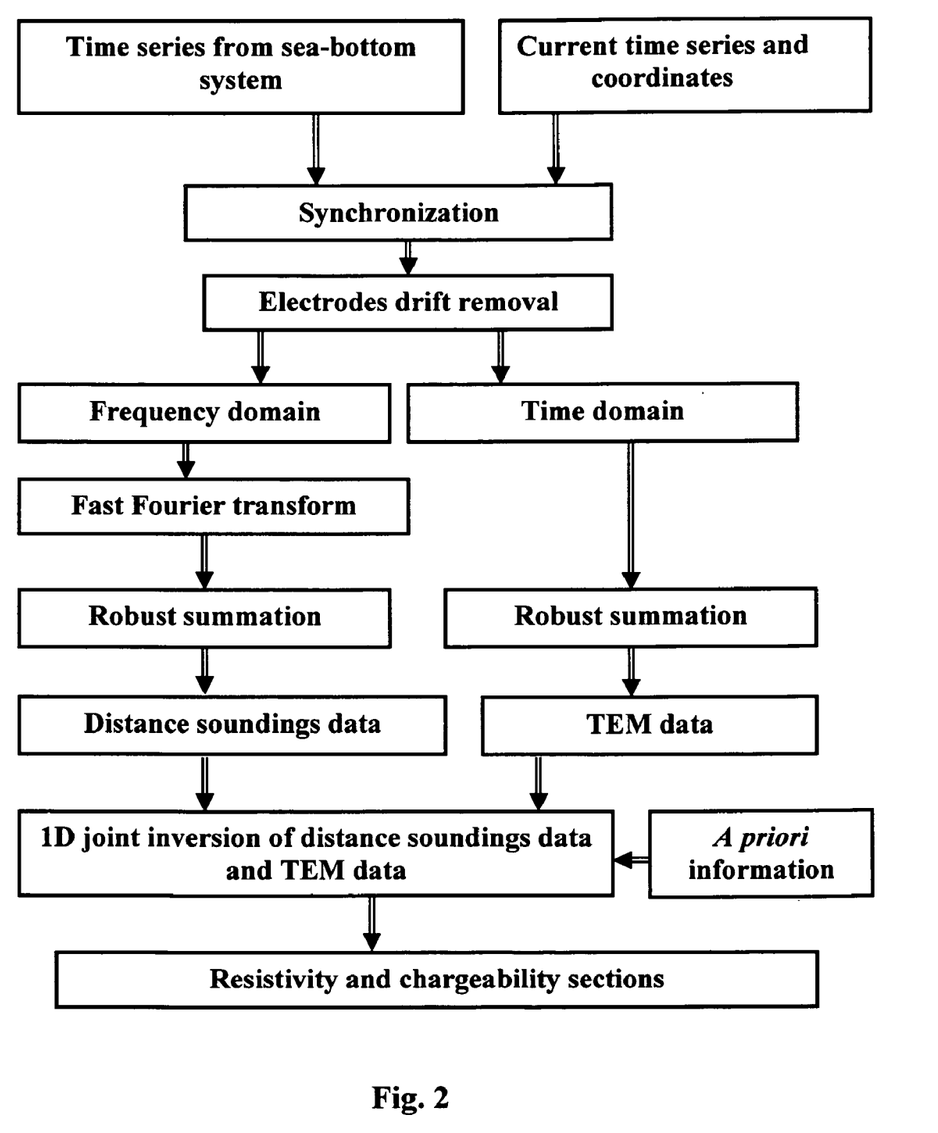
FIG. 2 illustrates a flow chart of exemplary data processing, according to an embodiment of the present invention.

The flow chart of exemplary data processing and joint data inversion is shown on FIG. 2. The three upper boxes represent the synchronization of signal time series of the generator ('Current time series and coordinates') and the bottom station ('Time series from sea-bottom system'). The synchronized signals are further subjected to adjustment ('Electrodes drift removal'), and are then divided into a frequency processing branch and a time-domain processing branch. The frequency processing branch includes a 'Fast Fourier transform' that is further subjected to a robust summation producing the plurality of space-domain data arrays ('Distance sounding data'). The time-domain processing branch also includes a robust summation producing the time-domain data arrays ('TEM data'). The space-domain data arrays, the time-domain data arrays, and predetermined programmed information are further processed by a joint inversion program unit ('1D joint inversion of distance sounding data and TEM data'), which results in obtaining the 'Resistivity and chargeability sections' that would further be used for hydrocarbon deposits prognosis.

Figure 3:
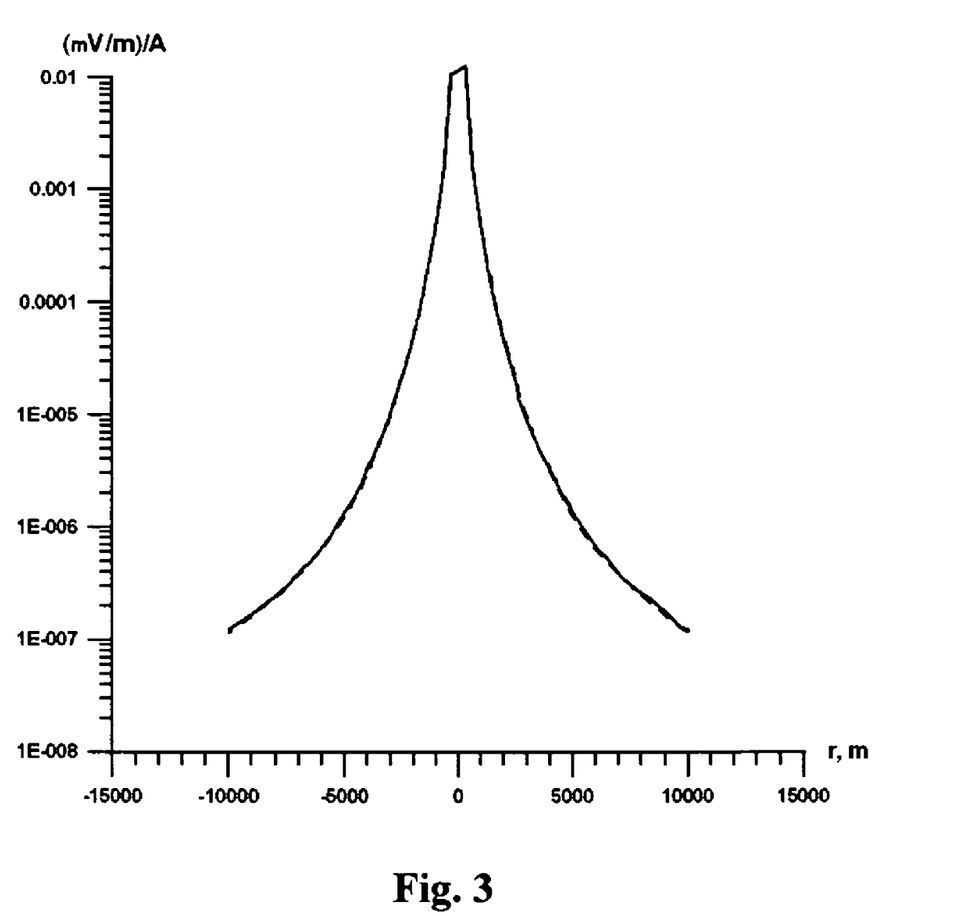
FIG. 3 illustrates a graphical representation of the results of processing of the space-domain signal data array and joint data inversion, according to an embodiment of the present invention.
Figure 4:
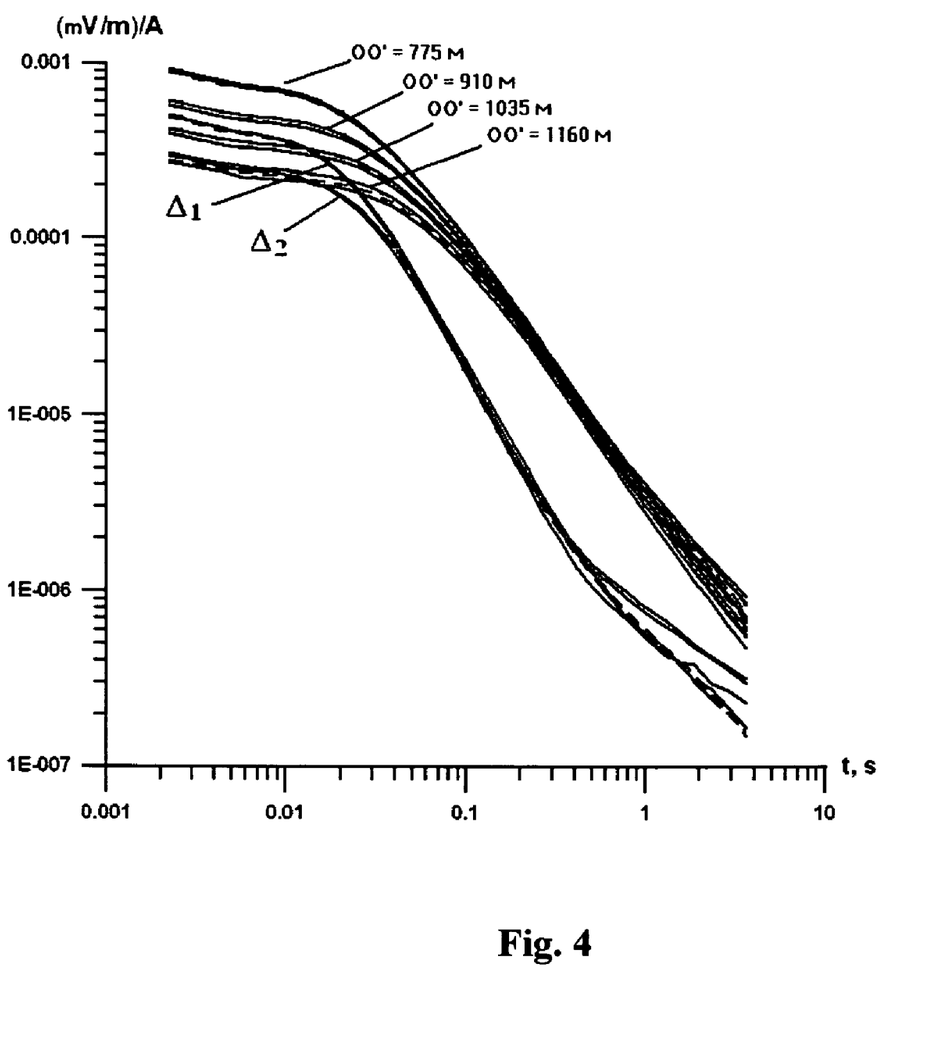
FIG. 4 illustrates a graphical representation of the results of processing of the time-domain signal data array for a number of offsets, according to an embodiment of the present invention.

Examples of distance and time soundings of data symmetrical relative to a reference sea-bottom station are shown on FIGS. 3 and 4. They are obtained on the shelf of Caspian Sea, wherein the solid lines represent measured data after the processing; the dash lines are resulted from calculation of the corresponding signals for the model obtained as a result of data inversion. The signals of the transient field are given for four offsets: 775, 910, 1035, and 1160 meters; $\Delta_1$ represents the difference between the signals at the 1-st and the 3-rd offsets; $\Delta_2$ represents the signals difference between the 2-nd and 4-th offsets. This is an analogue of measuring the spatial derivative.

Figure 5:
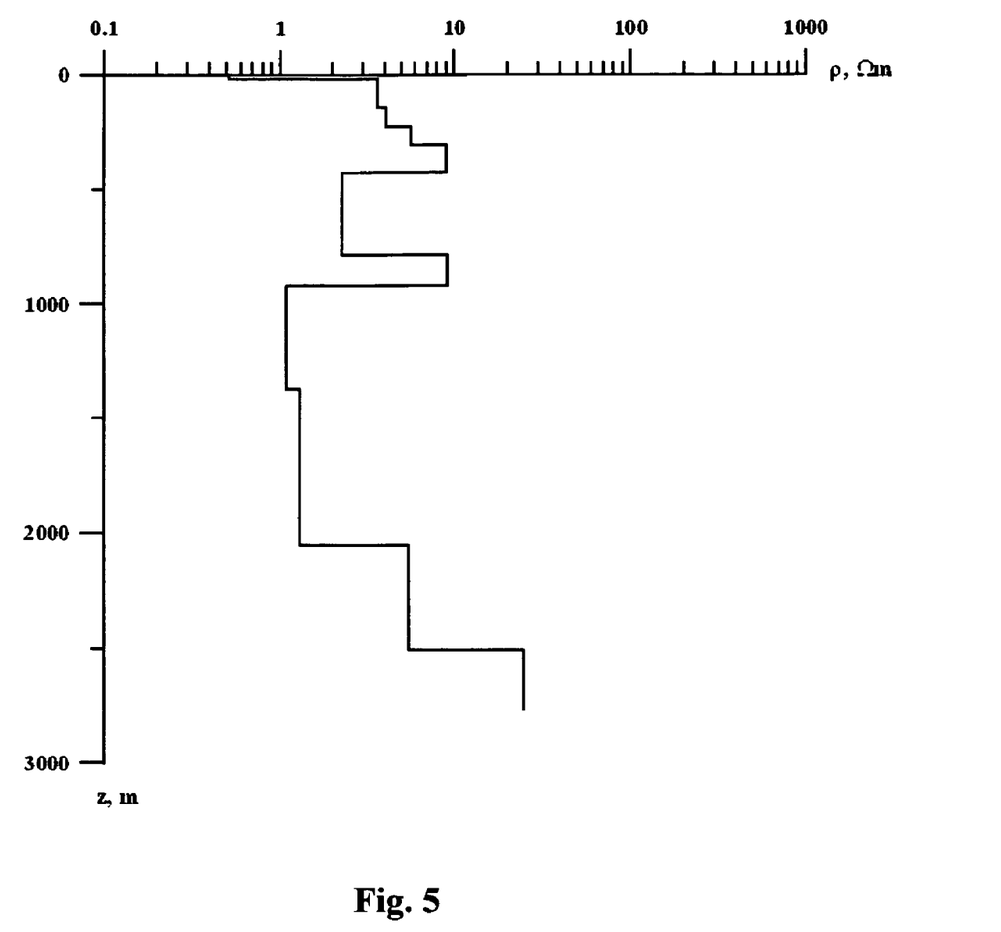
FIG. 5 illustrates a graphical representation of a resistivity section of the researched profile, obtained by the claimed method, according to an embodiment of the present invention.
Figure 6:
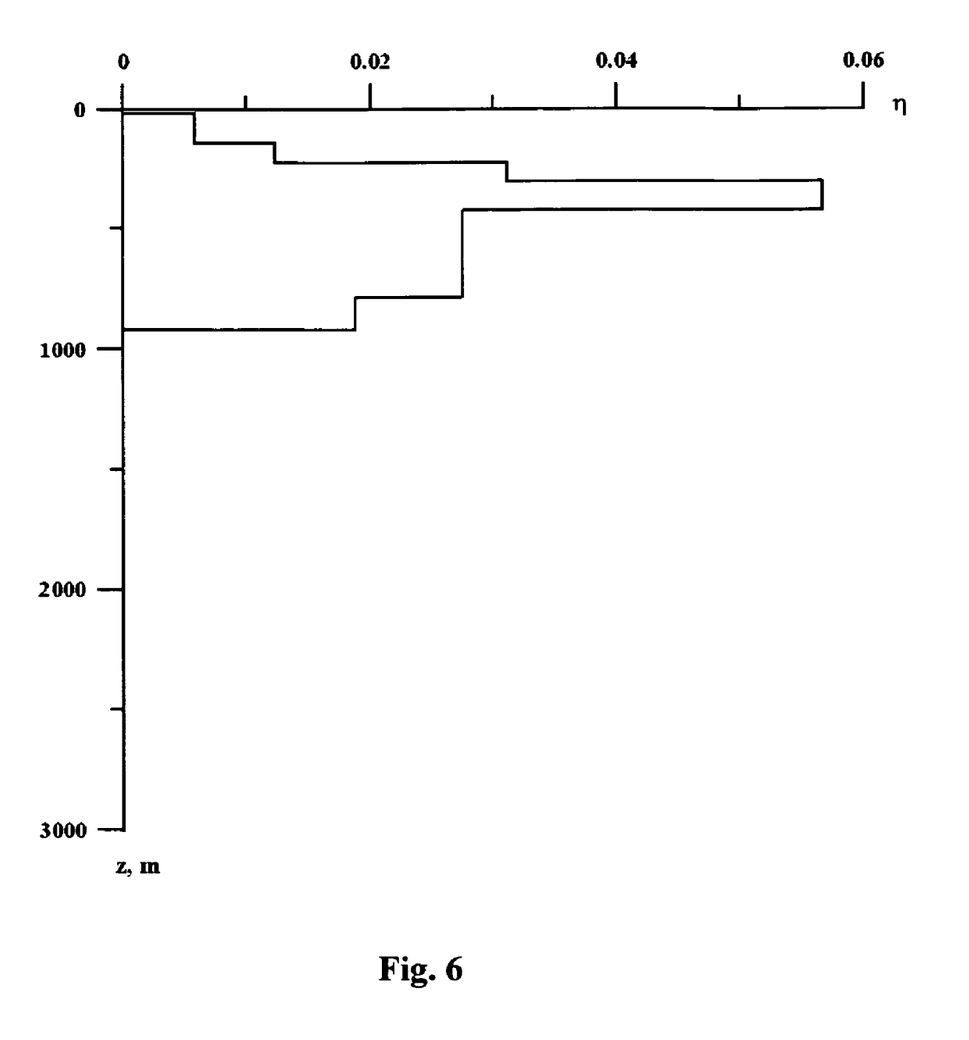
FIG. 6 illustrates a graphical representation of a chargeability section of the researched profile, obtained by the claimed method, according to an embodiment of the present invention.

FIG. 5 shows the obtained resistivity section, and FIG. 6 shows the obtained chargeability section.

Figure 7:
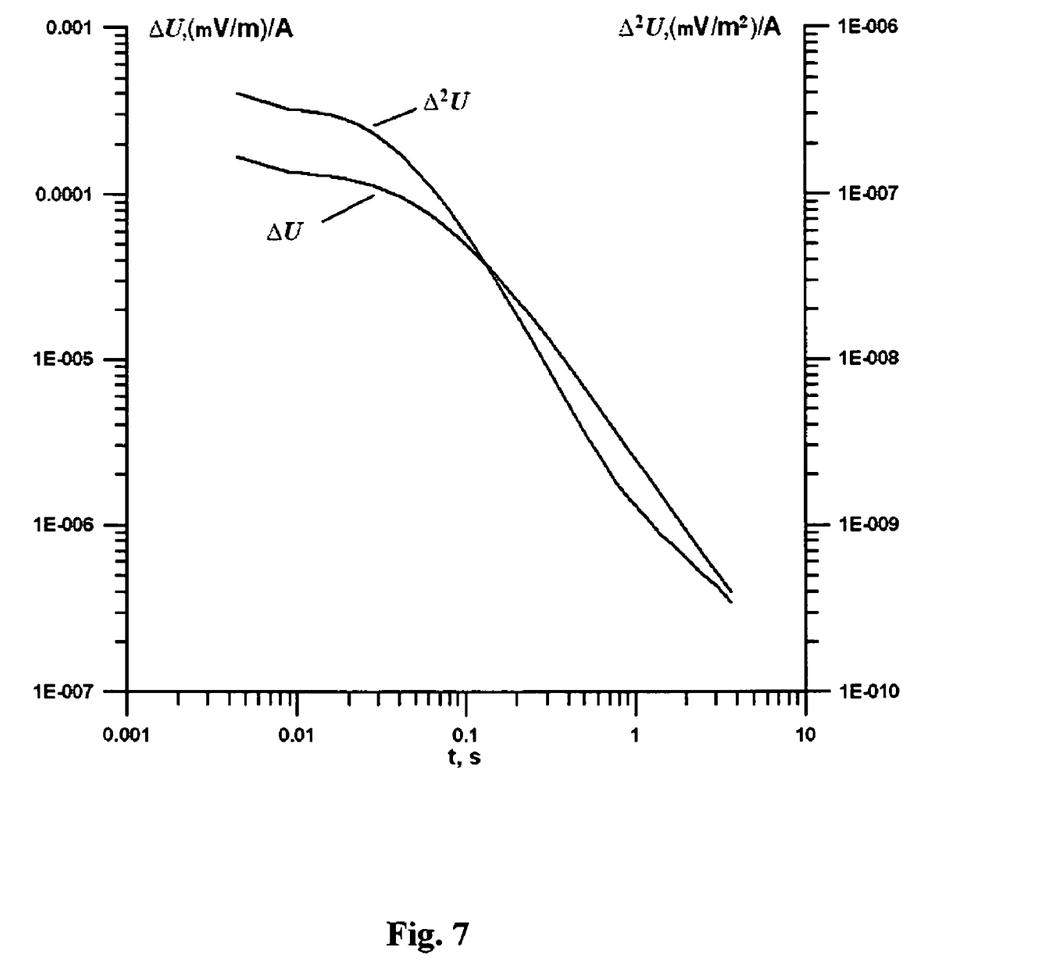
FIG. 7 illustrates a graphical representation of the result of integration process on a predetermined range of offsets for the measurements represented on FIG. 4.

FIG. 7 shows the result of integration process on the range of offsets 1000-2000 meters for the measurements represented on FIG. 4. The obtained results testify that the signal-to-noise ratio significantly increases due to the integration process, though the anomalous features of the field behavior are still visible in the obtained integral decays.

We claim:
1. A method for marine electrical survey of hydrocarbon deposits in a researched profile of sea-bottom, said method comprising the steps of:
providing a generator of electric current, associated with a generator clock;
providing a generator line, wherein said generator is capable of generating a predetermined electric current in the generator line, said electric current is generated in the form of alternative-sign pulses with a generator signal frequency associated with a predetermined duration and a predetermined on-off time ratio of said pulses, said generator line is capable of exciting an electric field;
providing a tow means capable of towing the generator line;
providing a plurality of sea-bottom stations capable of measuring signals of said electric field, each said sea-bottom station is associated with a station clock;
synchronizing the generator clock and the station clocks of said plurality of sea-bottom stations;
mounting said sea-bottom stations at predetermined points, including a first point and a last point, along a predetermined profile line extending through and beyond said researched profile;
positioning said tow means at a predetermined distance from the first point beyond said researched profile;
towing said generator line by the tow means along said predetermined profile line to a point located at said predetermined distance from the last point beyond said profile;
switching said generator on and causing said generator line of exciting the electric field;
measuring time series of the electric current signals of said generator line, and measuring time series of the signals of said electric field by the sea-bottom stations during both the on and off periods of said electric current pulses;
recording signal values of the signals of said measured time series;

for each said sea-bottom station forming:
- a plurality of space-domain data arrays for dependencies of said signal values upon offsets during the movement of said tow means wherein the dependencies are formed for said generator signal frequency, and for a predetermined number of higher odd harmonics frequencies nearest to said generator signal frequency; and
- a plurality of time-domain data arrays for selected offsets based on said signal values, the time domain data arrays are formed for dependencies of the signal values upon time, wherein the dependencies are formed for time intervals of signal growing or decay after switching on or off the current in said generator line;

providing a step for joint inversion of data for each said sea-bottom station for the time-domain data arrays and for the space-domain data arrays; and determining both a bottom strata resistivity for a predetermined depth of said researched profile and polarization characteristics of said researched profile based on the results of said step for inversion of data.

2. A method for marine electrical survey of hydrocarbon deposits in a researched profile of sea-bottom, said method comprising the steps of:

providing a generator of electric current, associated with a generator clock;

providing a generator line, wherein said generator is capable of generating a predetermined electric current in the generator line, said electric current is generated in the form of alternative-sign pulses with a generator signal frequency associated with a predetermined duration and a predetermined on-off time ratio of said pulses, said generator line is capable of exciting an electric field;

providing a tow means capable of towing the generator line;

providing a plurality of sea-bottom stations capable of measuring signals of said electric field, each said sea-bottom station is associated with a station clock;

synchronizing the generator clock and the station clocks of said plurality of sea-bottom stations;

mounting said sea-bottom stations at predetermined points, including a first point and a last point, along a predetermined profile line extending through and beyond said researched profile;

positioning said tow means at a predetermined distance from the first point beyond said researched profile;

towing said generator line by the tow means along said predetermined profile line to a point located at said predetermined distance from the last point beyond said profile;

switching said generator on and causing said generator line of exciting the electric field;

measuring time series of the electric current signals of said generator line, and measuring time series of the signals of said electric field during both the on and off periods of said electric current pulses;

recording signal values of the signals of said measured time series;

for each said sea-bottom station forming:
- a plurality of space-domain data arrays for dependencies of said signal values upon offsets during the movement of said tow means wherein the dependencies are formed for said generator signal frequency, and for a predetermined number of higher odd harmonics frequencies nearest to said generator signal frequency; and
- a plurality of time-domain data arrays for selected offsets based on said signal values, the time domain data arrays are formed for dependencies of the signal values upon time, wherein the dependencies are formed for time intervals of signal growing or decay after switching on or off the current in said generator line;

providing a joint data inversion for each of said sea-bottom station for the time-domain data arrays and for the space-domain data arrays; and determining both a bottom strata resistivity for a predetermined depth of said researched profile and polarization characteristics of said researched profile based on the results of said joint data inversion.

3. The method according to claim 2, wherein said sea-bottom stations further comprise electrodes, and said step of providing a joint data inversion further comprises:

synchronizing said time series of the electric current signals of said generator line and said time series of the signals of said electric field, thereby obtaining synchronized signals;

adjusting the synchronized signals by removing drift of said electrodes; and dividing the adjusted signals into a frequency processing branch and a time-domain processing branch;

wherein
said frequency processing branch includes a fast Fourier transform, and a robust summation producing said plurality of space-domain data arrays, and
said time-domain processing branch includes a robust summation producing said plurality of time-domain data arrays.

4. The method according to claim 2, wherein said predetermined distance from the first point and from the last point is defined in the range of from 5 to 15 kilometers.

5. The method according to claim 2, wherein said generator line is provided in the form of a horizontal dipole generator line or of a vertical dipole generator line.

6. The method according to claim 2, wherein said alternative-sign electric current pulses have a substantially rectangular shape.

7. The method according to claim 2, wherein a predetermined sea-bottom station, chosen from said sea-bottom stations, is established as a reference station, and said time-domain and distance-domain data arrays are formed symmetrically in relation to the reference station.

8. The method according to claim 2, further comprising analysis of transient fields of said electric field signals.

9. The method according to claim 8, wherein said analysis of transient fields further includes both decays of the transient fields and spatial derivatives.

10. The method according to claim 9, further including integration of said decays in a predetermined range of offsets.

11. The method according to claim 10, wherein said integration is applied to the differences between said decays of sequential said pulses, divided by the difference between the corresponding sequential offsets.

12. The method according to claim 10, wherein said predetermined range of offsets is defined from 1000 to 2000 meters.

* * * * *